March 13, 1956 W. A. MINER 2,738,381

TELEGRAPH SIGNAL-OPERATED CARRIER OFF AND ON SYSTEM

Filed Aug. 1, 1952

INVENTOR.

WALTER A. MINER

BY [signature]

ATTORNEY 2,738,381

TELEGRAPH SIGNAL-OPERATED CARRIER OFF AND ON SYSTEM

Walter Adrian Miner, East Paterson, N. J., assignor to International Telephone and Telegraph Corporation, a corporation of Maryland Application August 1, 1952, Serial No. 302,066

8 Claims. (Cl. 178—66)

This invention relates to a telegraph signalling system of the frequency modulation (FM) carrier type, and particularly to a tone suppression circuit in said system for removing the carrier wave from the line during those periods when the line is not utilized for signal transmission.

In known FM carrier telegraphy systems, the carrier signal is continuously maintained on the line. Because the carrier signal is continuously on the line, it has been difficult to adapt FM carrier telegraphy for party line communication systems, since in party line systems, the line must be idle before a party can transmit.

An object of this invention is to provide an FM carrier telegraphy system which is suitable for party line communication.

Another object of this invention is to provide a tone suppression circuit for an FM carrier telegraphy system, to remove the carrier from the line during periods when the line is not being utilized for transmission.

In accordance with an aspect of this invention there is provided a telegraph signalling system of the FM carrier type, including a work circuit, for suppressing the carrier frequency in the system during certain periods. A control circuit is provided which is responsive to a given signal of predetermined time duration for controlling the operativeness of the work circuit. The control circuit comprises a charge-storage device coupled to the work circuit which is charged during the persistency of the given signal, until a given value is attained; this given value is attained at the expiration of the predetermined time duration. The work circuit is responsive to this given value to suppress the carrier frequency in the system.

The above-mentioned and other features and objects of this invention and the manner of attaining them will become more apparent and the invention itself will be best understood, by reference to the following description of an embodiment of the invention taken in conjunction with the accompanying drawings, wherein.

To facilitate an understanding of the invention, the tone suppression circuit will be described as constituting two conjunctive parts. The first part is a work circuit and determines the existence of the carrier on the line, and the second part is a control circuit for controlling the operation of the work circuit.

Figure 1:
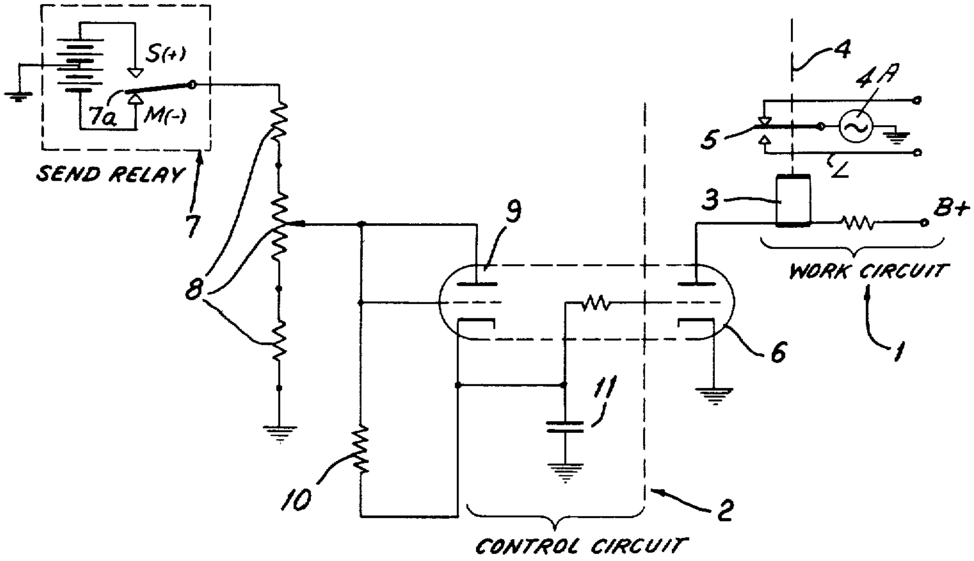
Fig. 1 is a schematic diagram of a preferred embodiment of the invention.
Figure 2:
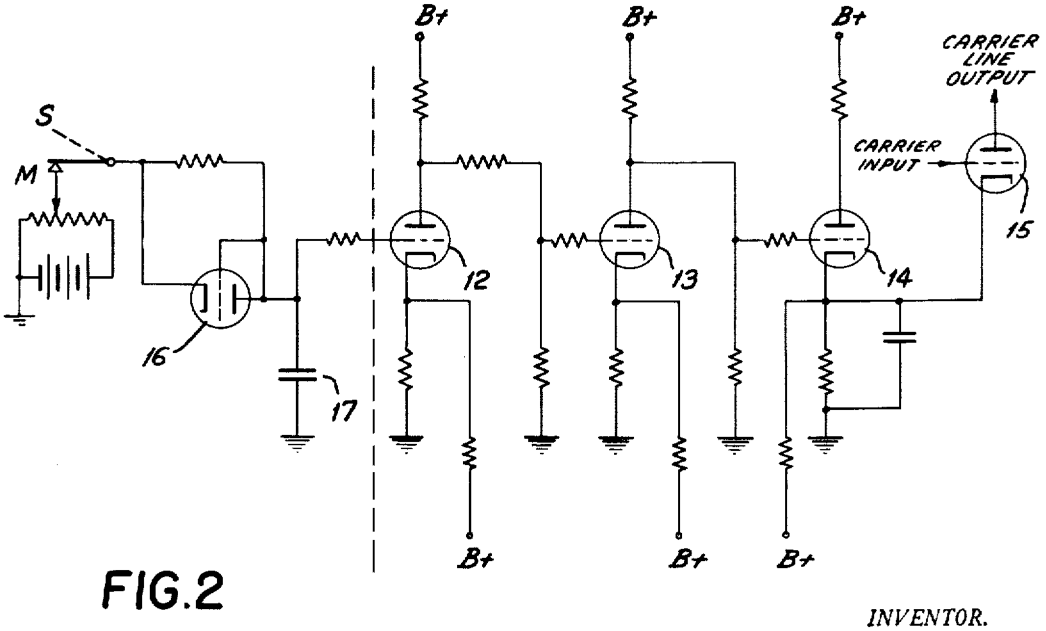
Fig. 2 is a schematic diagram of another embodiment of the invention.

The work circuit may include a relay for controlling the continuity of the carrier line by opening or closing carrier control contacts in the path of the carrier, as shown in Fig. 1; or, the work circuit may be devoid of mechanical operating devices (such as relays) and control the existence of the carrier on the line by controlling the operativeness of an electron tube positioned in the carrier path, as shown in Fig. 2. Although two forms of work circuits are illustrated, other types of known work circuits may be utilized in conjunction with the control circuit without departing from the spirit and scope of this invention.

The control circuit, constituting the basis of my invention, operates in response to an uninterrupted carrier or other given normal signal persisting for a predetermined time duration. Two alternative forms of the control circuit are shown in Figs. 1 and 2, respectively.

Referring now to Fig. 1, there is shown a tone suppression circuit comprising a work circuit 1 and a control circuit 2. The work circuit comprises a relay 3 having an armature 4 mechanically coupled to a movable contact 5 for controlling the electrical continuity of the carrier path. For example, merely by way of illustration, the path from a carrier source 4A to the line L is completed by means of the relay 3. In Fig. 1 the relay 3 is shown in its deenergized condition wherein the carrier source 4A is disconnected from the line L. The circuit for relay 3 is controlled by the plate current of a triode 6.

A telegraph sending relay 7 comprising a movable contact 7*a*, produces, in this embodiment, negative mark and positive space signals on the line. The normal or unoperated position for this relay is the mark position thus providing a negative voltage over the resistors 8 to bias the rectifier 9 to the cut-off condition. Although in practice rectifier 9 is a triode having its plate and grid electrodes directly connected to provide suitable diode operating characteristics, other forms of diodes having desirable operating characteristics may be used. A resistor 10 is bridged across the diode 9 and is connected to one terminal of a charge-storage device, e. g., capacitor 11; the other terminal of capacitor 11 being connected to ground. When the send relay 7 is in its normal or unoperated position and a mark signal is being transmitted over the line, diode 9 is non-conductive and capacitor 11 is charged negatively through resistor 10 independently of tube 9. The values of resistor 10 and capacitor 11 are selected such that the time constant of the charging circuit is predetermined, and at the expiration of a time duration equivalent to the time constant of the charging circuit, a given negative potential is developed across the capacitor 11 which is sufficient to bias the grid of tube 6 to plate current cut-off and thus deenergize relay 3 so as to open the carrier line, and thereby remove the signal from the line. With the first space impulse, the cut-off bias is removed from diode 9, rendering it conducting and providing a rapid discharge path for capacitor 11 through the relatively low plate-to-cathode circuit of tube 9. Therefore, the negative bias is removed from triode 6, rendering it conducting thus returning relay 3 to its original position and closing the carrier path for transmission.

Referring now to Fig. 2, the work circuit in this embodiment comprises a group of sequentially operating electron tubes 12, 13 and 14, respectively. Tube 14 is coupled to an electron tube 15 which is serially connected in the carrier path. During normal communication, tube 12 is in the cut-off condition, and therefore a sufficiently high potential is imposed on the grid of tube 13 rendering tube 13 conducting. The anode potential of conducting tube 13 is sufficiently low to maintain tube 14 in the cut-off condition. Tube 15 is normally conducting to maintain electrical continuity in the carrier line. A given time after signal communication is terminated, the control circuit delivers a positive potential sufficient to render tube 12 conducting, which sequentially causes tube 13 to become non-conducting and tube 14 conducting. The cathode potential of tube 14 is sufficient to cut-off tube 15 and thereby open the carrier line.

Although the principle of the control circuits of Figs. 1 and 2 is similar, the control rectifier 16, Fig. 2 (which like the rectifier 9 of Fig. 1 is a triode having its plate and grid strapped together so as to operate as a diode) is connected so that its capacitor 17 builds up a positive charge with respect to ground, whereas in Fig. 1, capacitor 11 builds up a negative charge with respect to ground. This, of course, is a matter of design depending on the requirements of the work circuit.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. In a telegraph system, a device for controlling the carrier off and on condition of a line, a control circuit for said device having an input end and an output end with the output end connected to said device to control said on and off condition, a source of telegraph signal elements of respectively different polarities and adapted to be selectively connected to the input end of said control circuit, said control circuit including a voltage storing element, means including a charging circuit between said source and said element and effective as long as signal elements of one polarity are applied to said input end for a predetermined duration to charge said element to a predetermined voltage and thereby to cause said circuit to operate said device to carrier-off condition, and separate means in said control circuit effective as soon as signal elements of the opposite polarity are applied to said input end to close a normally open discharge circuit for said element and thereby to cause said control circuit to operate said device to carrier-on condition.

2. A telegraph system according to claim 1, in which said storage element is a capacitor and said separate means is a rectifier having its electrodes bridged across said capacitor in circuit with said source.

3. A telegraph system according to claim 2, in which a resistor is bridged directly across the electrodes of said rectifier to provide a direct charging circuit for said capacitor from said source independently of said rectifier.

4. A telegraph system according to claim 3, in which the rectifier is a diode having a cathode and an anode, the cathode being connected to the control grid of a separate grid-controlled tube in said control circuit, and means connecting the output of said tube to said device.

5. A telegraph system according to claim 1 in which said device is an electromagnetic relay.

6. A telegraph system according to claim 1 in which said device is a grid-controlled tube.

7. A telegraph system as claimed in claim 8, in which said rectifier is a diode having a cathode and an anode, and wherein said control circuit comprises a separate tube having an input electrode and an output electrode, means coupling said cathode with said input electrode and additional means coupling said output electrode to said device.

8. A telegraph system as claimed in claim 4, wherein said charging circuit comprises means for charging said capacitor negatively by the application to said capacitor of a negative telegraph signal element persisting for a predetermined interval, thereby to bias said grid-controlled tube to plate-current cutoff, said capacitor adapted to rapidly discharge when said diode becomes conductive, thereby to remove the bias from said tube.

References Cited in the file of this patent

UNITED STATES PATENTS 1,981,861 Goodwin -------------- Nov. 27, 1934

U. S. DEPARTMENT OF COMMERCE

PATENT OFFICE

CERTIFICATE OF CORRECTION

Patent No. 2,738,381

March 13, 1956

Walter Adrian Miner

It is hereby certified that error appears in the printed specification of the above numbered patent requiring correction and that the said Letters Patent should read as corrected below.

Column 4, line 16, for the claim reference numeral "8" read -- 3 --.

Signed and sealed this 18th day of March 1958.

(SEAL)

Attest:

KARL H. AXLINE

Attesting Officer

ROBERT C. WATSON

Commissioner of Patents